July 15, 1969  R. SCHMIDT  3,456,187
THREAD SPEED MEASURING APPARATUS
Filed July 20, 1965  4 Sheets-Sheet 1
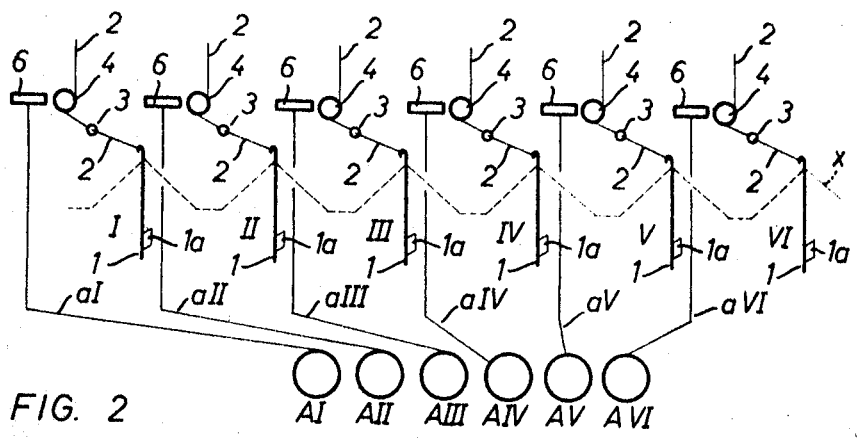
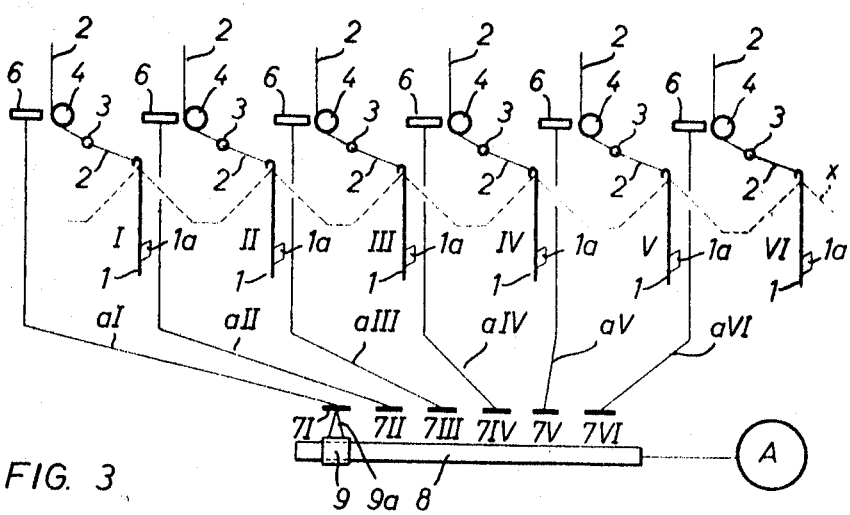
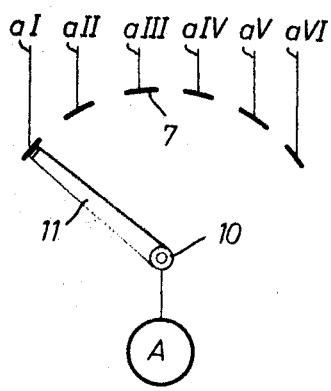
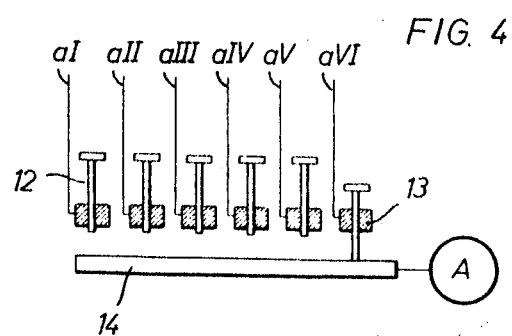
Inventor
Richard Schmidt
by Michael J. Striker July 15, 1969  R. SCHMIDT  3,456,187
THREAD SPEED MEASURING APPARATUS
Filed July 20, 1965  4 Sheets-Sheet 2
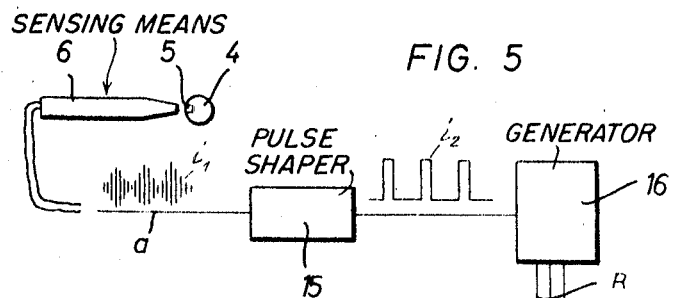
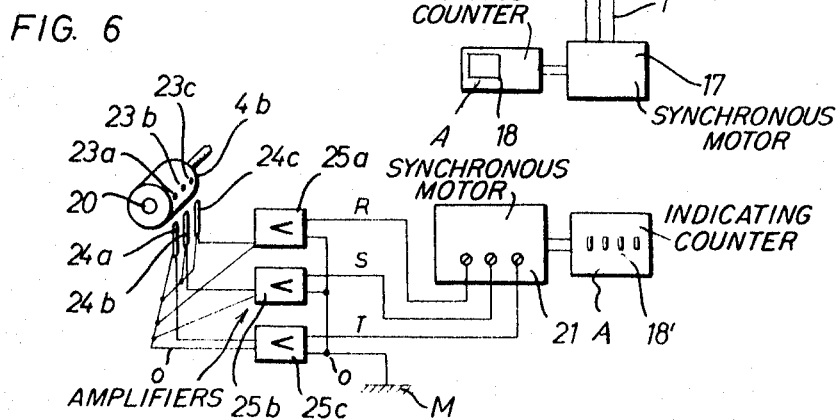
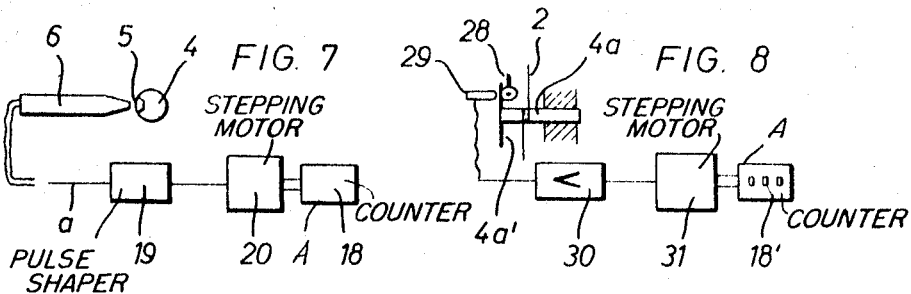
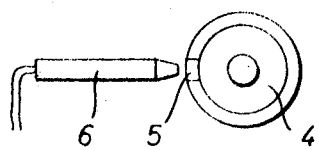
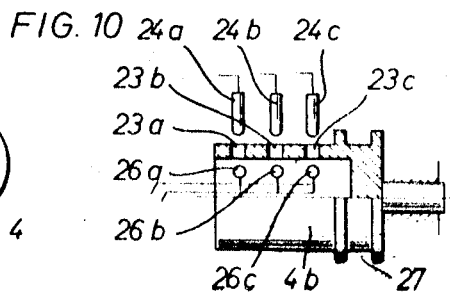

United States Patent Office 3,456,187
Patented July 15, 1969

3,456,187
THREAD SPEED MEASURING APPARATUS
Richard Schmidt, Stuttgart-Vaihingen, Germany, assignor to Franz Morat GmbH, Stuttgart-Vaihingen, Germany
Filed July 20, 1965, Ser. No. 473,452
Claims priority, application Germany, July 22, 1964, M 61,836
Int. Cl. G01r 11/00
U.S. Cl. 324—70                                                     3 Claims

ABSTRACT OF THE DISCLOSURE

The feeding speeds of threads at different stations of a knitting machine are checked by driving rotary members by the fed threads for producing impulses whose frequencies are proportionate to the respective feeding speeds. The impulse frequencies at the several stations can be sensed by sensing means which are selectively connected with a counter having indicating means for indicating the length of thread fed per time unit.

---

The present invention relates to a thread speed measuring apparatus for textile machinery, and more particularly to apparatus for measuring and indicating the speed of each thread fed at a knitting station of a knitting machine, such as a circular knitting machine or flat bed knitting machine.

Textile machines, and particularly knitting machines, where at different stations different threads are fed to the needles require for proper operation that the speed of thread fed at each station has a predetermined value which may be the same, or which may be different for different stations. If the speed of any fed thread at a station deviates from the predetermined speed required at the particular station, the loops formed at the respective station by the knitting needles do not have the proper size, and are consequently different from loops formed at other stations.

There are many reasons why the speed of the thread at a station may vary, for example uneven braking of threads, irregular thread feeding by the thread feeding rollers, the so-called "fournisseurs" and also incorrect adjustment of the cam box controlling the needle operations at the respective station may cause speed variations of the fed thread.

If irregularities are found in a knitted fabric after completion, it is difficult and extremely time-consuming to find out at which station the thread was fed at an improper speed. Frequently, the faulty operation is recognized only after a large piece of material has been knitted, causing losses on material and time.

It is one object of the present invention to overcome this disadvantage of known textile machines, and to provide means for detecting threads which are fed at an improper speed.

Another object of the invention is to provide means for measuring the speeds of all threads fed at the stations of a textile machine, such as a knitting machine.

Another object of the invetnion is to provide means for indicating the speed of each and all threads fed at the several feeding stations of a textile machine.

Another object of the invention is to measure and indicate the speed of all threads fed at several stations of a textile machine by selectively operating a single measuring and indicating means by any of the threads fed at the several feeding stations of a textile machine.

Another object of the invention is to determine the rotary speed of a plurality of rollers, each of which is driven by a thread fed at different stations of a textile machine by electronic counter means.

A related object of the invention is to measure the rotary speed of the rollers in such a manner that the rollers rotated by the fed threads do not have to provide the mechanical power for driving the measuring means.

Another object of the invention is to indicate the number of revolutions of the rollers counted by the counter means as distance units per time unit corresponding to the length of thread fed during a time unit. With these objects in view, the present invention relates to a thread speed measuring apparatus for textile machines, which is particularly suited for knitting machines having a plurality of knitting stations or thread feeding stations. One embodiment of the invention comprises thread feeding means at each station of the machine; a roller at each station mounted for free rotation and being driven by the thread fed at the respective station at a rotary speed proportionate to the feeding speed of the thread; and means for measuring the rotary speeds of the rollers at the several stations, and thereby the feeding speed of each thread.

In the preferred embodiment of the invention counter means are connected with the rollers to count the number of revolutions of each roller, and are provided with indicator means for indicating the length of the thread fed per time unit at each station.

In one embodiment of the invention a counter and indicator is provided at each knitting station so that the operator, walking around the machine, successively checks the indications which represent the speed of the fed thread.

In another embodiment of the invention, a single counter and indicator is mounted on a suitable housing part of the machine, and the rotary speed of the rollers is measured by sensing means which are electrically connected with the central counter. Switch means in the circuit are manually operable to connect the common counter with any selected sensing means so that the counter can be set to indicate the speed of the fed thread at each station of the machine. It will be understood that particularly if a patterned fabric is knitted on a knitting machine, the feeding speeds of threads supplied at different knitting stations are different. However, plain or ribbed fabrics may also require different feeding speeds of threads at particular stations. This may be necessary due to the use of different threads which consist of different fibers and have different resiliency and expansibility. Furthermore, if at one knitting station, loops of a different size are produced, it is necessary to set the respective thread feeding means to a different speed, even if the reasons for the variation of the loop size at the particular station are not known at the moment. It is, however, desirable to know at which speed the particular thread has to be fed at a station in order to produce loops having the same size as the loops produced at other stations.

Evidently, the operator controlling the machine knows the feeding speed required at each station, and when a variation of the feeding speed occurs at a particular station, and is indicated by the apparatus of the invention, the reason for the speed variation must be found, and the condition corrected. Even if the machine was started at predetermined feeding speeds at all stations, the feeding speed at a particular station may change, and the counter and indicator of the invention permits the operator to recognize such a condition, and to take corrective action, which may require checking of the feeding speeds at all stations.

In accordance with the present invention, each roller driven by the threads at a feeding station, includes means, such as a magnet at its periphery, or openings permitting passage of a beam of light, for cyclically actuating a sensing means to produce impulses whose frequency is proportionate to the rotary speed of the sensed roller, and thereby to the feeding speed of the thread. The impulses are amplified and supplied to counter means which under the control of the impulses, produce indications representing the speed or the length of the fed thread.

In one embodiment, the counter means include a generator producing a polyphase current under the control of the impulses, and a synchronous motor receiving the polyphase current and consequently rotating in synchronism with the thread driven roller which produces the control impulses. The synchronous motor drives a counter, which may be a commercially available mechanical counter provided with tens transfer means. In this manner, the thread driven roller need not provide the force for driving the counter, and such force is supplied by the synchronous motor. Consequently, a fed thread is not braked in any manner by the roller.

In another embodiment in which three photodiodes are energized by a beam of light once during every revolution of the roller, the impulses produced by the three sensing photo diodes may be directly used for driving the synchronous motor by which the counter is driven.

It will be appreciated that the electric or electronic sensing of the rotary speed of the thread driven roller has not only the advantage that the fed thread need not supply the power for driving a counter, but also that a single counter, located at a suitable part of the machine housing, can be selectively connected by manually operated switch means to cables leading from each sensing means at the several stations to the common counter and indicator means.

Rotation of the rollers is in no way braked when electronic sensing means are used, except for the friction in bearings, which is negligible.

The switch means by which the selection of the station to be checked is made by the operator can be constructed as a slide contact successively engaging contacts connected with the cables leading to the stations, or a turnable switch arm may pass successively over the contacts. It is preferred, however, to use key operated switches mounted in a keyboard provided with conventional locking means which hold each actuated key in the switch closing position until another key is actuated whereupon the previously actuated key is released. In such an arrangement, the operator can immediately select the station to be checked by depressing the corresponding key.

The arrangement of the present invention is advantageously applied not only to a single textile machine, such as a circular knitting machine having forty-eight knitting stations, but may be applied to a whole group of machines so that the speed of the fed thread at any station of several machines can be checked by the operator at the same place where a keyboard electrically connected to the sensing means of all stations is provided.

While a counter means and indicator at each station serves the purpose, a common central counter means and indicator is far more economical, and facilitates the work of the controlling operator.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary schematic developed view illustrating a portion of the needle cylinder of a circular knitting machine provided with a thread speed measuring device according to one embodiment of the invention;

FIG. 2 is a fragmentary schematic developed view of the needle cylinder of a circular knitting machine provided with a thread speed measuring apparatus according to a second embodiment;

FIG. 3 is a fragmentary schematic view illustrating a modification of the embodiment of FIG. 2;

FIG. 4 is a fragmentary schematic view illustrating another modification of the embodiment of FIG. 2;

FIG. 5 is a schematic diagram of an electric circuit including counter means controlled by electromagnetic sensing means;

FIG. 6 is a schematic diagram illustrating an electric circuit for counter means controlled by photoelectric sensing means;

FIG. 7 is a schematic diagram illustrating a modified electric circuit for counter means controlled by electromagnetic sensing means;

FIG. 8 is a schematic diagram illustrating a modified electric circuit for counter means controlled by photoelectric sensing means;

FIG. 9 is a fragmentary elevation illustrating the electromagnetic sensing means of FIGS. 5 and 7 in greater detail;

FIG. 10 is an elevation, partially in axial section, illustrating the photoelectric sensing means of FIG. 6 in greater detail;

Figure 11:
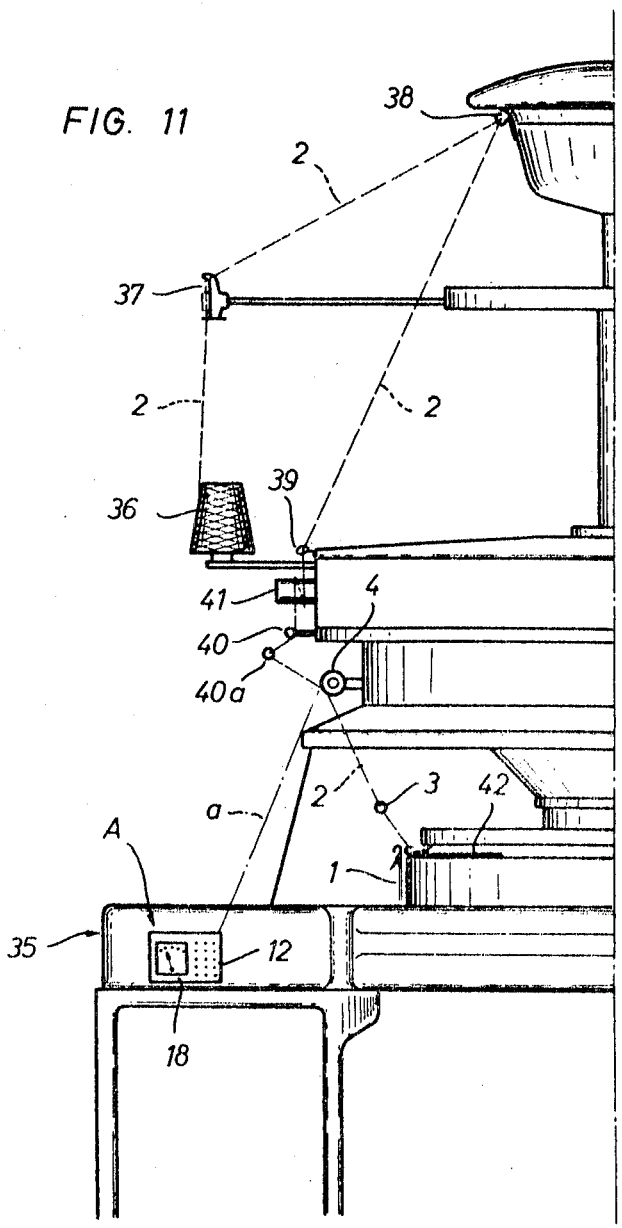
FIG. 11 is a fragmentary elevation illustrating a circular knitting machine provided with a thread speed measuring apparatus according to the embodiment of FIG. 2.

Referring now to the drawings, and more particularly to FIG. 1, in this embodiment counter means AI, AII, AIII, AIV, AV, and AVI are provided for measuring and indicating, respectively, the feeding speeds of threads 2 supplied at six knitting stations I to VI of a circular knitting machine. The cylinder needles are schematically represented by the needles 1, and are operated by cam boxes in the usual manner so that the heads of the knitting needles move along the path X while knitting the threads 2 into a fabric. Cylinder needles 1 have butts 1a cooperating with cam tracks of the cam boxes, or being operated by pattern wheels in the usual manner.

A circular knitting machine may have forty-eight knitting stations, but only six knitting stations are shown in FIG. 1. As shown in FIG. 11, at each knitting station, a thread 2 supplied from a bobbin 36 passes through a brake 37, and eyes 38, 39 to a thread feeding roller 41, and then through thread guides 40, 40a to a roller 4. From roller 4 the thread passes through a guide 3 to the cooperating cylinder needles 1 and dial needles 42.

The thread is wound in a loop about feeding roller 41 which is driven at a predetermined speed from the main shaft of the knitting machine. The thread also passes in a loop about the roller 4 which is mounted in ball bearings for free rotation, and is driven by thread 2 to rotate at a peripheral speed corresponding to the feeding speed of thread 2 so that the rotary speed, and the number of revolutions of each roller 4 at the several knitting stations is proportionate to the feeding speed of the thread.

Every roller 4 includes means for cyclically actuating a correlated sensing means 6 in such a manner that sensing means 6 produces an impulse which is supplied through cables aI to aVI to the counter means AI to AVI. The construction of the sensing means will be described hereinafter in greater detail. The term "counter means" is used in the present application in a very broad sense to include any device for measuring, and indicating, the rotary speed of a roller 4, and thereby the feeding speed of the respective thread 2. It is theoretically possible to connect each roller 4 mechanically with a counter means, but such an arrangement has the disadvantage that the thread must not only drive the freely rotatable roller 4, but also provide the power for actuating the respective counter means. While this solution is feasible for machines using very thick and strong threads and needles, since under such circumstances the load on the rollers will not produce a detrimental braking of the threads, the sensing of the rotary speeds of the rollers by electric sensing means, and the electric transmission of the impulses produced by the sensing means to the counter means is preferable since rollers 4 need not supply the power for operating the counter means so that threads 2 are not braked or unduly tensioned.

The rotary speed and the number of revolutions of each roller 4 is directly proportionate to the feeding speed of the respective threads 2, and consequently, it is preferred to provide the counter means with indicators whose dials show distance units per time unit for example inches of thread fed per minute at each station.

The embodiment of FIG. 2 corresponds in every way to the embodiment of FIG. 1, but instead of six counter means AI and AVI, only one counter means A is provided. Cables aI to aVI are respectively connected to stationary contacts 71 to 7VI which are successively engaged by slide contact 9a of a slide 9 which can be moved by the operator along a contact bar 8 which is connected with the counter means A.

Consequently, counter means A can be connected by the operator with each of the sensing means 6 so that the counter means will indicate the feeding speed of the thread at the respective station which was selected by placing slide contact 9, 9a on the respective stationary contact 7I to 7VI.

In the modification of FIG. 3, the cables aI to aVI are respectively connected to stationary contacts 7 which are arranged along a circle. A contact arm 11 has one end 10 mounted for turning movement about an axis, and the other ends cooperating with stationary contacts 7 so that by turning of contact arm 11, each of the sensing means 6 shown in FIG. 2 can be connected to the counter means A so that the feeding speed of each thread fed at the knitting stations can be measured and indicated.

The embodiment of FIG. 2 may also be modified as shown in FIG. 4 according to which the cables aI to aVI are respectively connected to key operated contacts 12 by stationary conductive supports 13. Each actuated key contact 12 engages a contact bar 12 which is connected with the counter means A. The keys form a keyboard, and may be arranged in several rows as schematically indicated in FIG. 11. The keyboard is constructed in a well known manner so that only one key 12 can be depressed at any time, while actuation of another key causes release of the previously actuated key and return of the same to an inoperative position. Consequently, the operator can select any station by depressing the respective key 12, whereupon counter means A will indicate the speed of the thread at the respective knitting station I to VI. An indicator 18 of counter means A is shown in FIG. 11.

Contacts 8, 9, 10, 11, 12, 14 constitute manually operated switch means connected with circuits aI to aVI for selectively connecting each of the sensing means 6 with counter means A so that the same is operated at a speed proportionate to the rotary speed of the sensed roller, and to the feeding speed of the thread driving the sensed roller at the respective selected station.

In the embodiment of FIG. 4, a clearing key, not shown, is advantageously provided for releasing any actuated key 12. It is also possible to omit the above described interlocking means of the keys, so that the counter means is energized as long as any selected key is held in a depressed position establishing an electric connection with contact bar 14.

Figure 12:
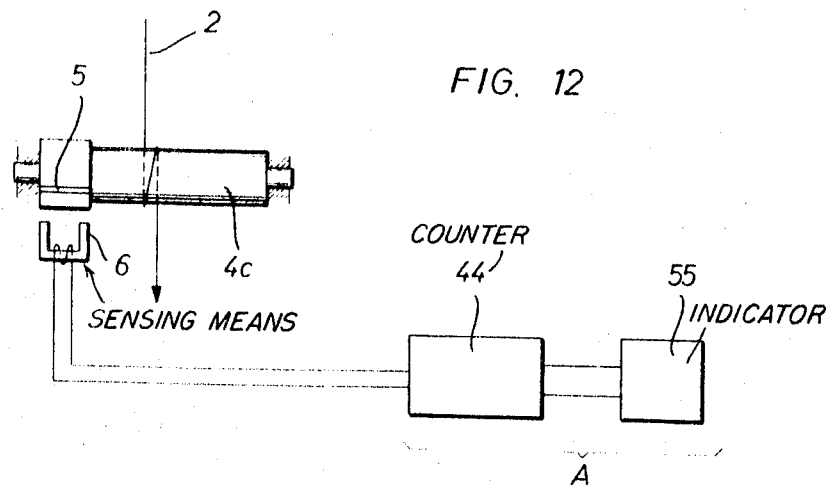
FIG. 12 is partly an elevation, and partly a diagram illustrating another modification of an electric circuit for counter means controlled by electromagnetic sensing means.

One embodiment of the electromagnetic sensing means is shown in FIG. 12. A roller 4c is mounted in bearings for free turning movement and is rotated by thread 2. Roller 4c has a flange portion with a cylindrical surface into which an axially extending magnetic bar 5 is embedded. A magnet 6 is located opposite the flange portion of roller 4c and carries a winding in which an impulse is created every time the magnet bar 5 passes electromagnet 6. As explained with reference to FIGS. 1 and 2, the impulses created in electromagnet 6 are supplied through cables aI to aVI to counter means A including a counter 44 and an indicator 55. The frequency of the impulses corresponds to the number of revolutions of roller 4c, and consequently to the feeding speed of thread 2 which may be indicated by indicator 55.

FIG. 9 shows a roller 4 with a magnetic means 5 at the moment in which magnetic means 5 passes electromagnet 6 for producing an impulse. FIGS. 5 and 7 show corresponding electromagnetic sensing means with different electric circuits.

FIG. 10 illustrates a photoelectric sensing means for the embodiments shown in FIGS. 1 to 4.

The roller 4b is driven by a thread 2, not shown in FIG. 10, passing in a loop over the cylindrical surface portion 27 which is bounded by a pair of flanges. The remaining part of roller 4b is hollow, and provided with a row of three axially aligned openings 23a, 23b, 23c.

A stationary source of light preferably including three lamps 26a, 26b, 26c is located in the interior of roller 4b in a position to emit light through openings 23a, 23b, 23c. Three stationary photo diodes 24a, 24b, 24c are respectively arranged in planes passing perpendicularly to the axis of roller 4b through openings 23a, 23b, 23c and lamps 26a, 26b, 26c.

During rotation of roller 4b, light passing through openings 23a, 23b, 23c into photo diodes 24a, 24b, 24c once during each revolution will cause the photocells to produce simultaneously three impulses after each revolution of roller 4b. When the impulses are counted, or their frequency determined, they are a measure of the rotary speed of roller 4b and of the feeding speed of thread 2.

As noted above, the term "counter means" is used in a very broad sense in the present application, and any device responsive to the impulses produced by electromagnetic sensing means 6 or by photocells 24a, 24b, 24c to indicate the speed of the feeding means may be used.

FIG. 5 shows one embodiment of counter means cooperating with an electromagnetic sensing means 5, 6. An impulse is produced in electromagnetic means 6 once for each revolution as schematically indicated in FIG. 5 at $i_1$. The impulses are supplied through a cable a, representing cables aI to aVI, to a pulse shaper 15 of known construction in which the pulses are transformed to be rectangular and have steep flanks as shown at $i_2$. Impulses $i_2$ are supplied to a polyphase generator without iron parts of the type described in the German publication "Elektronik" 1963, volume 9, page 271. Generator 16 is provided with switching transistors and produces a polyphase current supplied through a cable R, S, T to a synchronous motor 17 which rotates at a speed proportional to the frequency of impulses $i_1$ and $i_2$. A counter A including indicator means 18 as shown in FIG. 11 is driven by synchronous motor 17 and indicates the speed of the fed thread which drives roller 4.

FIG. 7 shows a modified arrangement provided with electromagnetic sensing means 5, 6 in which the impulses are supplied through cables a and pulse shaper 19 to a stepping motor 20 which drives counter A. The stepping motor makes one angular step for each impulse so that the rotary speed thereof and of counter A, corresponds to the rotary speed of roller 4 and to the feeding speed of the thread driving the same. A stepping motor of this type is described, for example, in the U.S. Patent 2,834,896.

In the embodiment of FIG. 6, photoelectric sensing means are used as described with reference to FIG. 10. During rotation of roller 4b, openings 23a, 23b, 23c assume once during each revolution a position located between the stationary source of light 20 within the roller and the three photo diodes 24a, 24b, 24c which are actuated to simultaneously produce pulses which are supplied to amplifiers 25a, 25b, 25c. The amplified impulses are supplied through a cable R, S, T to a synchronous motor 21 which drives counter A with indicator means 18'. The number of revolutions of motor 21 and of counter A corresponds to the number of revolutions of roller 4 within the same time period, and consequently represents the feeding speed of the thread driving roller 4b.

FIG. 8 illustrates another modification in which a roller 4a is provided with a flange or disk 4a' which has at least one opening spaced from its axis. A source of light 28 is located behind disk 4a' along the path of the opening, and a photo diode 29 is aligned with the source of light 28. Once during each revolution, the opening in disk 4a' permits passage of light from lamp 28 into the photocell which produces an impulse. The impulses are amplified by amplifier 30 and supplied to a stepping motor 31 which drives a counter A with indicator means 18' in the form of number wheels behind windows in the casing of the counter.

In the embodiment of FIG. 12, electromagnetic sensing means 5, 6 produce impulses whose frequency represents the number of revolutions per second of roller 4c. An electronic revolution counter 44 receives the impulses and is connected to an indicator device 55.

Figure 12A:
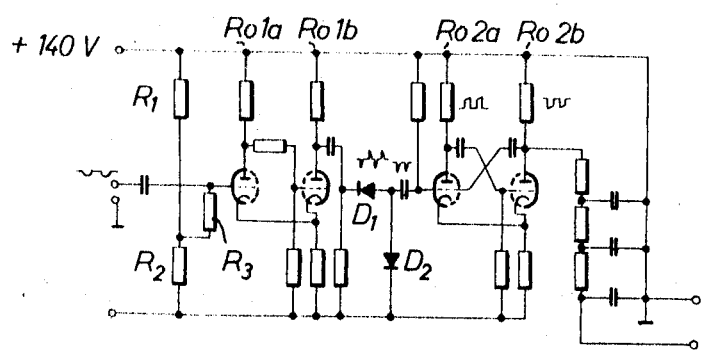
FIG. 12a is a diagram illustrating details of the electric circuit of FIG. 12.

The electronic revolution counter 44 is of the type described in the German language book "Praktische Elektronik," by Heinz Richter, 4th edition, Franck'sche Verlagshandlung Stuttgart. FIG 12a corresponds to FIG. 54 described on pages 98 and 99 of this book.

The pulses of the current produced by the electromagnetic sensing means 5, 6 are supplied through a capacitor to a multivibrator including triodes Ro1a and Ro1b. In the initial position, triode Ro1a is conductive, and triode Ro1b is closed, a condition obtained by a voltage divider including resistors R1, R2, R3. When a negative impulse is supplied, the grid bias and the anode current of triode Ro1a drop so that the anode voltage of triode Ro1a rises which causes current to flow through triode Ro1b so that triode Ro1b becomes conductive and triode Ro1a closes. This condition of the multivibrator is maintained until the grid voltage of triode Ro1a reaches a certain value whereupon the initial condition is again obtained.

Positive rectangular pulses with very steep flanks develop at the anode of triode Ro1b, and due to electric differentiation effected by the following condenser and resistor, each rectangular pulse is transformed into a pair of positive and negative pulses of extremely short duration. The positive pulses are cut off by the rectifier circuit D1, D2 while the negative pulses are counted. The principle of operation is explained in the first volume of the above mentioned book "Elektronik."

The above described circuit has the effect that the pulses always have the same shape and amplitude, irrespective of the shape and voltage of the pulses produced by the sensing means. However, the pulses of the sensing means must have a certain minimum amplitude to be able to control the multivibrator.

The frequency of the impulses is measured by a monostable multivibrator including triodes Ro2a and Ro2b. When a negative impulse arrives at the grid of triode Ro2a, triode Ro2b becomes conductive. The time constants of the capacitors between the two triodes Ro2a and Ro2b determine the time period during which the multivibrator remains in the condition, whereupon the initial condition is again restored. At the anode of triode Ro2b, voltage pulses of constant area are produced so that the product of current and time is constant. An integrator circuit comprising resistors connected in series and capacitors connected in parallel behind the resistors, respectively, produces a direct current voltage at the output, whose median value corresponds to the anode current of triode Ro2b. It can be shown that this median value is proportional to the frequency of the impulses at the input of the first multivibrator. The exactness of this relationship depends substantially on the maintenance of constant voltages in the multivibrator. When the filament voltages are maintained exactly constant by suitable devices, the error is within the range of 1% of the indicated value.

A counter means A including the circuit of FIG. 12 in device 44 of FIG. 12, and an indicator 55 indicating the speed per time unit, is comparatively inexpensive and operates very reliably at a high degree of exactness so that such a device is particularly suitable for permanent use as a counter means for measuring the feeding speeds of threads at the stations of textile machinery.

The counter means A may also be constructed in the manner of a tachometer, and the roller 4 may be used for producing an eddy current in a member which controls an indicating pointer.

The thread speed measuring apparatus of the present invention has been described as provided in a knitting machine, but it will be appreciated that the apparatus can also be used in spinning machines, twisting machines, winding machines, looms, flat bed knitting machines of the cotton type, and in other textile machines in which the speed of a thread has to be measured and indicated.

It will be understood that each of the elements described above, or two or more together, may also find a useful application in other types of textile machines differing from the types described above.

What is claimed as new and desired to be secured by Letters Patent is:

1. Thread speed measuring apparatus for textile machinery having a plurality of thread feeding stations, comprising, in combination, thread feeding means at each station, a roller at each station mounted on free rotation and having a wall formed with three openings; sensing means at each station including a source of light, and three photo diodes located on opposite sides of said wall so that said openings pass said photodiodes during each revolution of said roller whereby light passing through said openings actuates said photodiodes to produce impulses whose frequency is proportionate to the rotary speed of the sensed roller; amplifier means for amplifying said impulses; means at each station for guiding the feed thread to the respective roller so that said roller is continuously driven by the respective thread at rotary speed proportionate to the feeding speed of the thread; counter means including a synchronous motor and indicator means driven by said motor for indicating distance per time units; circuit means for supplying the amplified impulses to said synchronous motor for driving the same and including manually operable switch means for selectively connecting each of said amplifier means with said counter means so that said impulses produced by any sensing means connected with said counter means operate said counter means at a speed propotrionate to the rotary speed of the sensed roller and so that said indicator means indicate the length of the respective thread fed per time unit.

2. Apparatus as claimed in claim 1 wherein said wall forms a cavity in said roller, wherein said source of light is located in said cavity; and wherein said photo diodes are located outside of said roller.

3. Thread speed measuring apparatus for textile machinery having a plurality of thread feeding stations, comprising, in combination, thread feeding means at each station, a roller at each station mounted for free rotation and having a wall formed with three openings; sensing means at each station including a source of light and three photo diodes located on opposite sides of said wall so that said openings pass said photodiodes during each revolution of said roller whereby light passing through said openings actuates said photo diodes to produce impulses whose frequency is proportionate to the rotary speed of the sensed roller; means at each station for guiding the feed thread to the respective roller so that said roller is continuously driven by the respective thread at a rotary speed proportionate to the feeding speed of the thread; counter means including a synchronous motor and indicator means driven by said motor; circuit means for supplying the amplified impulses produced by a selected one of said sensing means to said synchronous motor for driving the same so that said impulses operate said counter means at a speed proportionate to the rotary speed of the second sensed roller and to the feeding speed of the thread driving the sensed roller.

References Cited

UNITED STATES PATENTS

| | | | |
|---|---|---|---|
| 2,783,540 | 3/1957 | Berry | 33—134 |
| 2,815,577 | 12/1957 | Ferre | 33—133 |
| 2,929,023 | 3/1966 | Mishcon | 324—20 |
| 2,936,525 | 5/1960 | Gollos | 33—134 |
| 3,068,579 | 12/1962 | Newman | 33—134 |
| 3,293,760 | 12/1966 | Weller | 33—129 |

FOREIGN PATENTS 1,169,345  4/1964  Germany.

OTHER REFERENCES

Electronic Industries, vol. 4, No. 4, April 1945, p. 87.
Electronics, May 1, 1957, pp. 188–190 (Pollard).
Control Engineering, vol. 9, No. 3, March 1962, p. 117.

RUDOLPH V. ROLINEC, Primary Examiner

M. J. LYNCH, Assistant Examiner

U.S. Cl. X.R.

235—103.5